United States Patent [19]

Ernst

[11] 4,320,578
[45] Mar. 23, 1982

[54] MEASURING INSTRUMENT MOUNTING APPARATUS

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 101,157

[22] Filed: Dec. 7, 1979

[30] Foreign Application Priority Data

Dec. 13, 1978 [DE] Fed. Rep. of Germany ....... 2853771

[51] Int. Cl.³ ............................................. G01B 11/04
[52] U.S. Cl. .................................... 33/125 T; 33/484; 356/373
[58] Field of Search ............. 33/125 R, 125 A, 125 T, 33/125 C, 483, 484; 356/373

[56] References Cited

U.S. PATENT DOCUMENTS

| | | | |
|---|---|---|---|
| 3,816,002 | 6/1974 | Wies | 356/395 |
| 4,060,903 | 12/1977 | Ernst | 33/125 R |
| 4,160,328 | 7/1979 | Ernst | 33/125 |
| 4,170,826 | 10/1979 | Holstein | 33/125 T |

FOREIGN PATENT DOCUMENTS 897163 11/1953 Fed. Rep. of Germany.
2505585 6/1978 Fed. Rep. of Germany.

OTHER PUBLICATIONS

West German Patent DE-GM No. 7513496.

*Primary Examiner*—William D. Martin, Jr.
*Attorney, Agent, or Firm*—Hume, Clement, Brinks, Willian & Olds, Ltd.

[57] ABSTRACT

A mounting apparatus for a length measuring instrument for having a housing, a scale, and a scanning unit that scans the scale includes a first mounting element for rigidly attaching one end section to the housing to a mounting surface, a flex element connected to the second end section of the housing, and a second mounting element for attaching the flex element, and thus the second end section of the housing to a mounting surface. The flex element is inelastic but flexible in the direction longitudinal with respect to the scale and serves to rigidly mount the instrument in directions transverse to the scale while allowing the housing to thermally expand or contract longitudinally.

10 Claims, 3 Drawing Figures

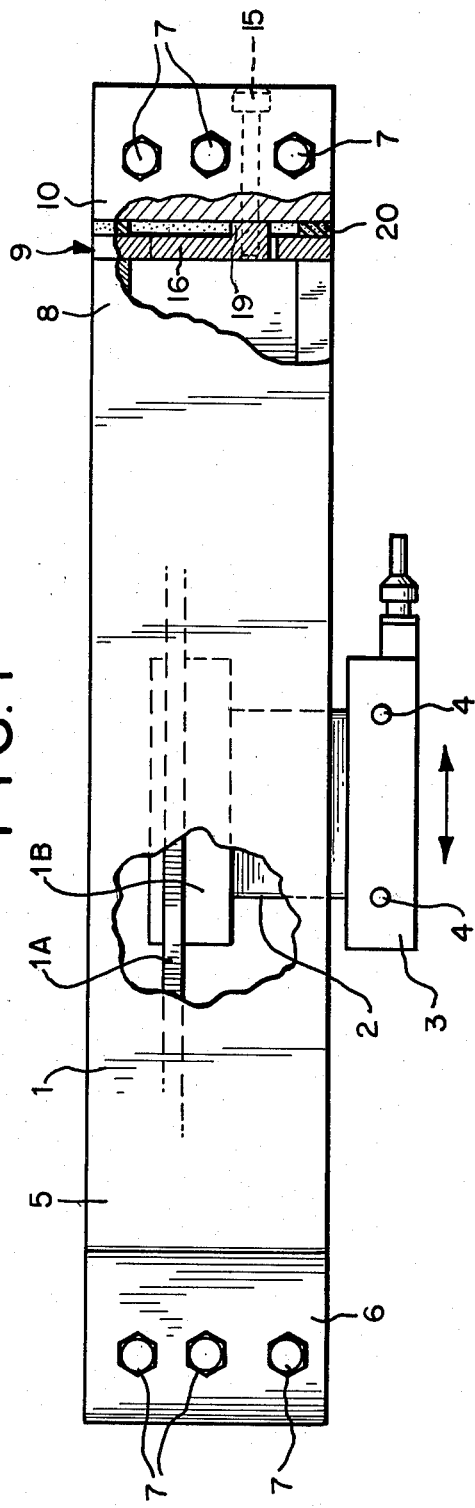
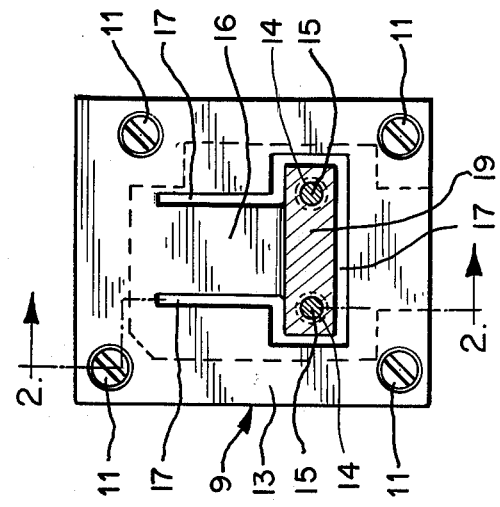
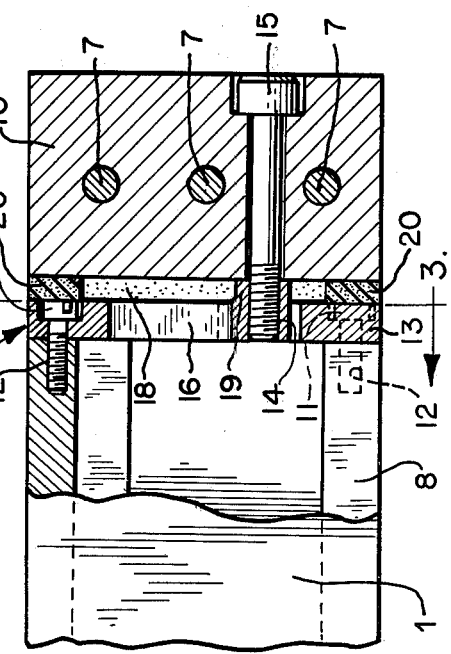

MEASURING INSTRUMENT MOUNTING APPARATUS

BACKGROUND OF THE INVENTION

The present invention concerns an improved mounting apparatus for a length measuring instrument of the scale-and-scanning unit type.

This type of length measurement instrument is used to obtain a high resolution measure of the relative position of two objects; for example, the bed and the slide of a processing or a measuring machine. Such instruments include a scale and a scanning unit mounted to scan the scale. As protection against environmental influences, the scale and scanning unit are often mounted in a stiff elongated housing. Entrainment means coupled to the scanning unit extend through a slit in a face of the housing, between sealing lips that keep the slit closed, and attach the scanning unit to a mounting surface on the processing or measuring machine whose displacement is to be measured. The housing containing the scale and scanning unit is attached rigidly onto the bed or the slide of the machine so that the frictional force created by the entrainment means rubbing on the sealing lips does not produce undesirable shifts of the housing and, with it, of the scale mounted within the housing.

Because the housing is generally made of a material, such as a light metal, whose thermal expansion coefficient differs from that of the material of the mounting surface to which the housing is rigidly attached, temperature fluctuations may cause relative contraction or expansion of the housing with respect to the mounting surface, thereby creating substantial longitudinal forces in the housing. These longitudinal forces can produce undesirable shifts of the housing surface. Such shifts cause the zero point of the scale to shift and may apply distorting tension or compression to the scale itself, leading to measurement errors.

The West German Pat. No. PS 25 05 585 shows a length measurement instrument in which both ends of the housing are attached to a mounting surface by means of flexible mounting elements. Each mounting element consists of an angular bracket which has been weakened by means of a transverse groove to create a flex line. These mounting elements do indeed allow a bending-free attachment of the housing, and thus of the scale, even to uneven mounting surfaces, but they do not eliminate the disadvantages produced by thermal expansion.

U.S. Pat. No. 3,816,002 describes another length measurement instrument whose housing is mounted onto a mounting surface by means of mounting elements that affix one end of the housing rigidly and the other end in a manner that allows for longitudinal movement of the housing. The element affixing the longitudinally moveable end includes a longitudinal oblong hole in which has been installed a spring-loaded bolt. This arrangement does accomodate temperature induced length changes; however, it has the disadvantage that the spring-loaded bolt may create excessive friction between the housing and its mounting surface. Furthermore, inevitable tolerances between the bolt and the oblong groove may result in undesirable oscillations of the instrument. Such oscillations can present a significant problem when the measuring instrument is mounted to a machine tool.

SUMMARY OF THE INVENTION

The present invention is directed to an improved mounting apparatus for a length measurement instrument of the above indicated type. The mounting apparatus of this invention substantially eliminates the distorting influence that length changes in the housing caused by thermal tension may have on measurement accuracy. The mounting apparatus is less subject to friction than the prior art approach discussed above and it absorbs shearing forces.

According to this invention, one end of the instrument's housing is rigidly attached to a mounting surface. The other end is attached to an intermediate flex element which in turn is attached to a rigid mount on the mounting surface. The function of the intermediate flex element is to keep the instrument rigidly mounted in directions transverse to the scale while allowing the housing to thermally expand or contract longitudinally. Preferably, the flex element includes a plate of flexible material bearing a U-shaped slit on its face which forms a tongue-shaped inner part therein. The housing is attached to the outer periphery of the flex element; the tip of the tongue-shaped inner part is attached to the mounting surface. This means of mounting the instrument holds the instrument rigidly attached to the mounting surface so as to prevent distortions in measurement, to prevent the instrument from moving transversely to the scale in any way, yet to allow for longitudinal thermal expansion and contraction of the instrument housing.

Other objects and advantages of the invention will become apparent during the description of the invention that follows.

DESCRIPTION OF THE DRAWINGS

FIG. 1 is a side view of a preferred embodiment of the length measurement instrument of this invention.

FIG. 2 is a sectional view taken in a plane parallel to the plane of FIG. 1, as indicated by line 2—2 of FIG. 3, of the end portion of the instrument of FIG. 1.

FIG. 3 is a cross-sectional view taken along line 3—3 in FIG. 2 showing the flex element of this embodiment.

DETAILED DESCRIPTION OF THE PREFERRED EMBODIMENTS

Referring to the length measuring instrument pictured in FIG. 1, a housing 1 in the form of a rectangular box has installed therein a scale 1a that is scanned in a known manner by a scanning unit 1b. A longitudinal slit (not shown) in the face of housing 1 is closed by sealing lips (not shown) through which extends an entrainment means 2 which is attached to the scanning unit 1b. The entrainment means 2 connects the scanning unit 1b with a mounting assembly piece 3 having bores 4. The assembly piece 3 attaches to a mounting surface via bores 4.

A first end section 5 of the housing 1 is rigidly attached to a first mounting element 6 which rigidly attaches to a mounting surface by means of the threaded fasteners 7. The second end section 8 of the housing 1 is connected via an intermediate flex element 9 to a second mounting element 10 which also connects to the mounting surface by means of fasteners 7.

As seen in FIGS. 2 and 3, the flex element is a thin plate bearing a U-shaped slit 17 which substantially detaches a tongue-shaped inner part 16 from the peripheral outer part 13 of the flex element 9. The second end section 8 of housing 1 is attached by means of bores 12 and screws 11 to the outer part 13 of the flex element 9, and the second mounting element 10 is attached by means of threaded bores 14 and screws 15 to the inner part of the flex element 9. The flex element 9 and the second mounting element 10 are separated from each other by means of an air space 18. A protrusion 19 extends from the inner part 16 of the flex element 9 through the air space 18 into contact with the second mounting element 10. An elastic seal 20 extends between the flex element 9 and the mounting element 10 along their peripheries, thereby enclosing the air space 18.

An advantage obtained through the present invention is that the rigidity of the connection of the first end section 5 of the housing to the mounting surface permits it to absorb the friction force produced by the entrainment means 2 as it rubs against the sealing lips. A second advantage is that, at the longitudinally non-rigid mount of the second end 8 of the housing to the mounting element 10 across the novel flex element 9, thermally induced length changes can occur in the housing 1 without affecting measurement precision. Yet another advantage is that the simple and inexpensive flex element 9 precludes any transverse movement or vibration of the casing and thus of the scale.

It is to be understood that the form of the invention here shown and described is to be taken as a preferred example of the same, and that various changes in the shape, size, and arrangement of parts (such as different scanning units and different scale support mount, or flex element structures) may be resorted to without departing from the spirit of the invention or the scope of the following claims.

I claim:

1. In a length measuring instrument for measuring the relative position of a first object with respect to a second object, the first object forming a mounting surface, the instrument having a scale, a scanning unit mounted to scan the scale, and a stiff housing having a first and a second mounting section, the housing carrying the scale and the scanning unit, an improved mounting apparatus comprising:
    means for mounting the scale to the housing such that the longitudinal position of the scale is determined by the housing;
    first means for fixedly mounting the first mounting section of the housing to the mounting surface;
    a flex member, attached to the second mounting section of the housing, the flex member being flexible but inelastic in a direction longitudinal with respect to the length of the housing defined by the first and second mounting sections, and rigid in directions transverse to the longitudinal direction; and
    second means for mounting the flex member to the mounting surface.

2. The length measuring instrument of claim 1 wherein the flex member comprises:
    a peripheral part, connected to the second mounting section of the housing; and
    an inner part, connected to the second mounting means.

3. The length measuring instrument of claim 1, further comprising:
    an elastic sealing member interposed between the second mounting means and the flex member.

4. The length measuring instrument of claim 1, 2, or 3 wherein:
    the flex member comprises a single planar piece of flexible but inelastic material.

5. In a length measuring instrument for measuring the relative position of a first object with respect to a second object, the first object forming a mounting surface, the instrument having a scale, a scanning unit mounted to scan the scale, and a stiff housing substantially surrounding the scale and the scanning unit, the housing having a first and a second mounting section, an improved mounting apparatus comprising:
    means for mounting the scale to the housing such that the longitudinal position of the scale is determined by the housing;
    first means for fixedly mounting the first mounting section of the housing to the mounting surface;
    a flex member formed from a planar piece of flexible but inelastic material having a substantially U-shaped slit cut through it, the slit separating the planar piece into an outer peripheral portion and an elongated inner portion, the inner portion being flexible in a direction transverse to the plane of the flex member in the region at which the inner portion is joined to the outer portion, the inner portion further being substantially rigidly connected to the peripheral portion in directions within the plane of the flex member;
    means for rigidly attaching the peripheral portion of the flex member to the second mounting section of the housing; and
    second means for mounting the inner portion of the flex member to the mounting surface.

6. In a length measuring instrument for measuring the relative position of a first object with respect to a second object, the first object forming a mounting surface, the instrument having a scale, a scanning unit mounted to scan the scale, and a stiff housing having a first and a second mounting section, an improved mounting apparatus comprising:
    means for mounting the scale to the housing such that the longitudinal position of the scale is determined by the housing;
    first means for fixedly mounting the first mounting section to the mounting surface;
    second means for mounting the second mounting section to the mounting surface; and
    a flex member flexible but inelastic in one direction and rigid in directions transverse to the one direction, the flex member positioned between the second mounting section and the second mounting means and oriented with the one direction extending longitudinally with respect to the length of the housing defined by the first and second mounting sections, the flex member having a first part, mounted to the second mounting section, and a second part, mounted to the second mounting means, such that the flex member flexes to accommodate thermally induced changes in the length of the housing.

7. The length measuring instrument of claim 6 wherein the flex member is a single planar piece of flexible but inelastic material.

8. The length measuring instrument of claim 7 wherein the first part comprises a peripheral planar portion of the flex member and wherein the second part comprises an inner planar portion of the flex member.

9. The length measuring instrument of claim 8 further comprising:
    an elastic sealing member interposed between the second mounting means and the first part of the flex member.

10. The length measuring instrument of claim 9 wherein the flex member has a substantially U-shaped slit cut therethrough to define the inner portion and the peripheral portion.

* * * * *